Jan. 5, 1971   K. I. GRAHAM   3,552,105
COTTON HARVESTER
Filed May 9, 1968   2 Sheets-Sheet 1
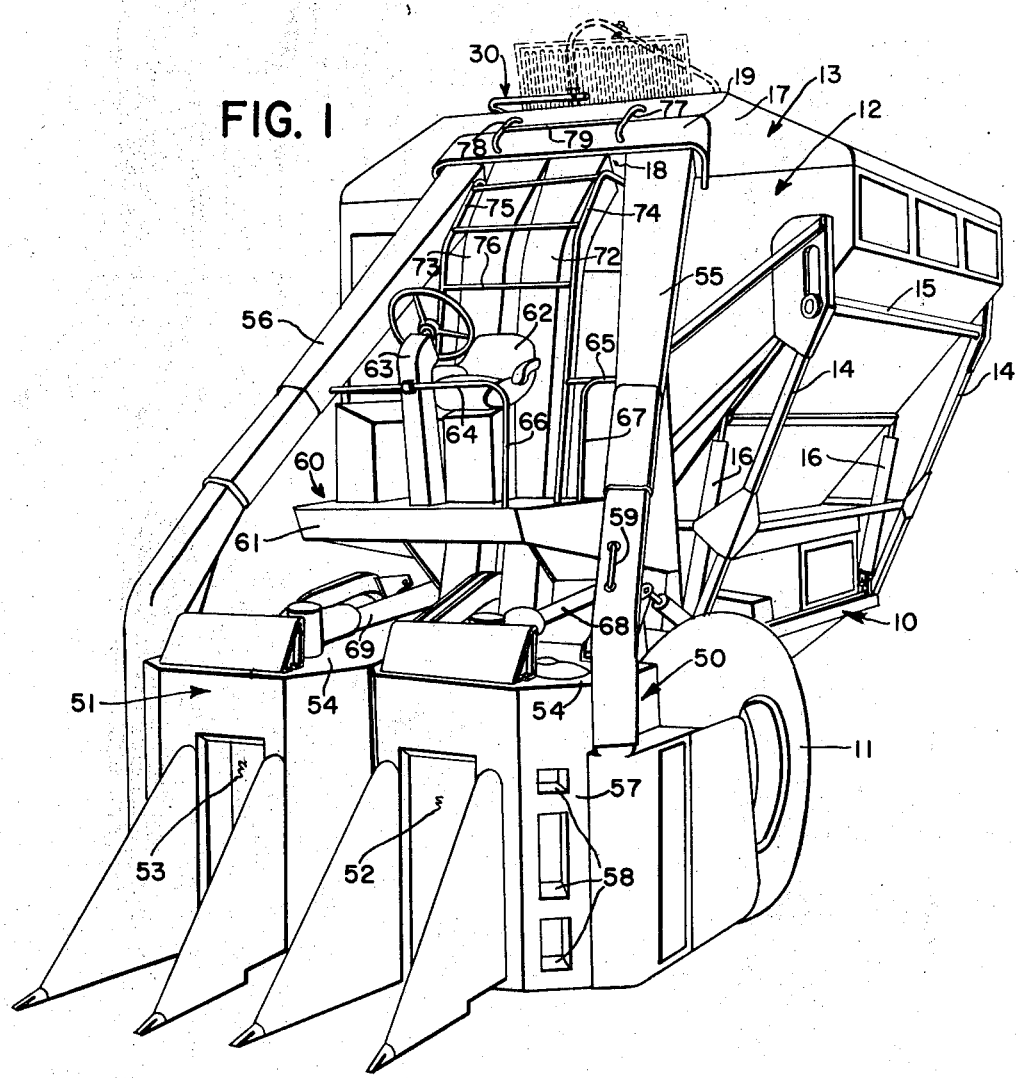
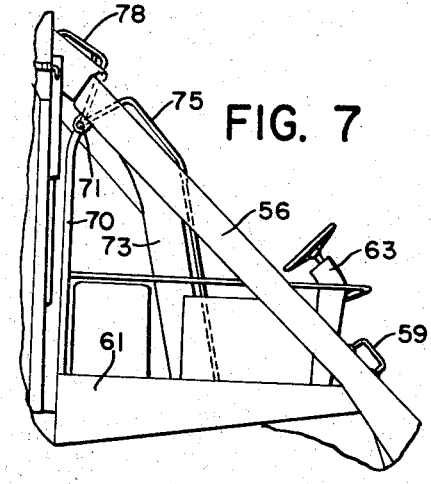
INVENTOR.
KARL I. GRAHAM
BY William A. Murray
ATTORNEY Jan. 5, 1971     K. I. GRAHAM     3,552,105
COTTON HARVESTER
Filed May 9, 1968     2 Sheets-Sheet 2
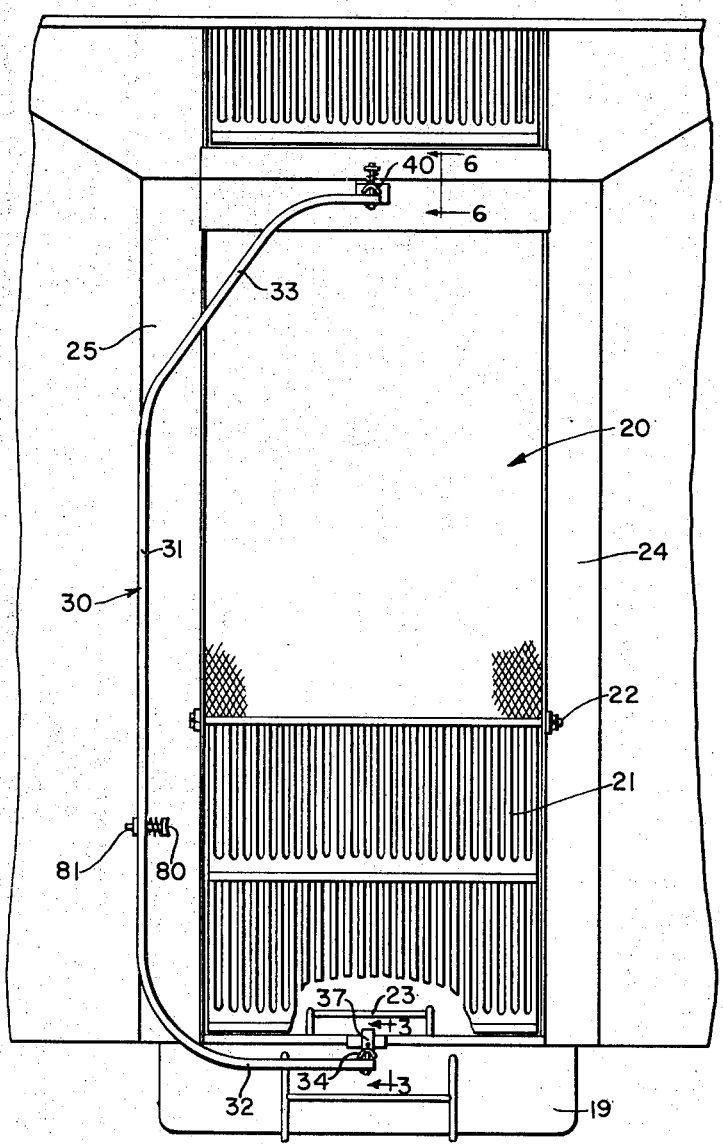
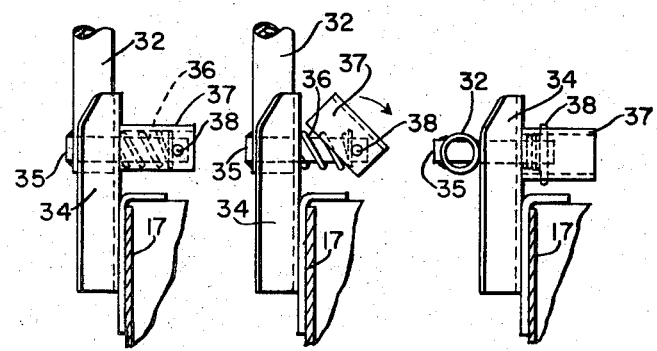
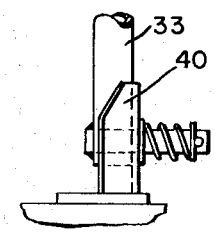
*INVENTOR.*
KARL I. GRAHAM
BY *William A. Murray*
ATTORNEY

United States Patent Office 3,552,105
Patented Jan. 5, 1971

3,552,105
COTTON HARVESTER
Karl Irvine Graham, Des Moines, Iowa, assignor to Deere & Company, Moline, Ill., a corporation of Delaware
Filed May 9, 1968, Ser. No. 727,843
Int. Cl. A01d 45/20
U.S. Cl. 56—12                         16 Claims

ABSTRACT OF THE DISCLOSURE

A combination of steps, ladders and hand rails for use with a cotton picker with the steps beginning adjacent the ground on the forward outer side of a picker unit and extending upwardly to the operator's platform with an entrance to one side of the operator's seat and continuing upwardly to the upper side of the basket where a hand rail extends lengthwise of the basket for affording balance and support to a person walking on top of the basket.

BACKGROUND OF THE INVENTION

This invention relates to structure provided on a cotton picker whereby an operator of the picker may ascend and descend to various levels in an efficient and safe manner.

It has heretofore been known to provide operator's platforms at the forward end of a cotton harvester so as to view and to operate the harvesting units as the picker moves over the field. There have been various ways of providing ascent and descent to and from the platform, the most conventional manner being to provide a ladder that projects outwardly, usually over one of the main traction wheels, and then downwardly to an area relatively close to the ground. One of the problems that exist in such a ladder arrangement is that in order for it to not engage the cotton plants, it must be located in an area that is often difficult for an operator to reach. Also, with the use of the more efficient and high-volume cotton pickers, space normally used for such items as ladders must now be utilized as part of the conveying systems and/or for increasing the capacity of the picker basket that receives the picked cotton bolls.

Also, it has heretofore been the practice of providing little or no means of ascending to the top of a picker basket. It is conventional to blow cotton against grillwork in the top of a picker basket so that trash may be blown through the grillwork while the cotton is retained in the basket. Also, it is not uncommon for a man to enter into the basket from the top of the basket so as to trample or compact the cotton in the basket. Oftentimes a ladder is provided for ascent and descent. However, in some instances the nature of the baskets has been such that a man could use the framework for climbing to the top of the basket. However, baskets have now increased in height and much of the structural framework has been covered or removed from the basket proper so that it becomes relatively dangerous not to provide suitable means for ascending to and descending from the top of the basket.

In providing for the various steps and locations of the ladders, guard rails, platforms and walkways, it should be kept in mind that if they are positioned properly, they will improve the operational efficiency of the operator, and consequently will be used. If the opposite occurs, they will not be used and consequently the operator will eventually use the more or less makeshift arrangements he discovers that will be a time-saving advantage to him. Properly placed steps, guard rails, ladders and platforms will therefore basically create not only an efficient operation but will also create a safer operation.

SUMMARY OF THE INVENTION

With the above in mind, it is an object of the present invention to provide access to the operator's platform on a cotton picker at a forward side of the platform and by step means that is provided in the forward outer side of a harvesting unit. In the particular type of harvester described, there are provided a pair of converging ducts extending from the outer sides of the row units to upper ends that discharge into the basket. It is contemplated that an operator will ascend one of the harvesting units by steps provided in the housing of the harvesting unit and will be aided by hand grips fixed to the duct structure of the respective unit as he moves to the entrance on the platform. The platform will be a step higher than the upper horizontal surface of the respective harvesting unit and an operator may reach for the guard rails on the platform at the same time he steps to the platform. Consequently, as he ascends to the platform, complete balance will be afforded by the structure provided for his safety and convenience in ascending.

It is a further object of the invention to provide a ladder that is completely supported on the platform and which is positioned on the rear portion of the platform so that an operator may move from the platform up the ladder and onto the top of the basket. There are normally provided two inner duct structures that, in the particular type of harvester to be described, ascends from lower ends adjacent the inner sides of a pair of harvesting units upwardly and slightly rearwardly to the upper portion of the picker basket. The ladder is provided with side rails that project forwardly of the latter ducts and are interconnected by rungs that are positioned forwardly of the ducts.

It is also an object of the present invention to provide at the top of the basket a pair of walkways positioned on opposite sides of the grill structure and a centrally located hand rail that may be locked in its upright position so that a man moving along the walkway may grip the hand rail with one hand while working with the other.

BRIEF DESCRIPTION OF THE DRAWINGS

FIG. 1 is a perspective view taken from the front and to the left side of a cotton harvester.

FIG. 2 is a plan view of a part of the basket lid.

FIG. 3 is a sectional view of a latch structure as taken substantially along the line 3—3 of FIG. 2 and with the hand rail in an up position.

FIG. 4 is a view similar to FIG. 3 but showing the latch structure therein in different positions.

FIG. 5 is a view similar to FIG. 3 but showing the latch structure in position when the hand rail is down.

FIG. 6 is a view taken substantially along the line 6—6 and showing the hand rail portion thereof in an upright position.

FIG. 7 is a side view of a portion of the picker that includes the platform and the forward parts of the cotton picker basket.

DESCRIPTION OF THE PREFERRED EMBODIMENT

Referring now to FIG. 1, the cotton picker includes a main frame 10 carried at its rear end by guide wheels, not shown, and at its forward end by a pair of traction wheels, one of which is shown at 11. Carried on the rear portion of the frame 10 is a picker basket 12. The basket 12 includes a lid 13 hinged to open by suitable linkages as the basket is filled and tilted. The basket 12 is carried on rigid framework 14 that carries a fore-and-aft extending horizontal pivot structure 15 on which the basket 12 may be tilted upwardly over the pivot structure 15 so as to discharge cotton over the upper fore-and-aft edge of the basket. As will be clearly apparent from viewing FIG. 1, the axis of the pivot structure 15 as well as the discharge side of the basket is offset transversely from the fore-and-aft extending center line of the harvester. Suitable hydraulic cylinders 16 are provided for the purpose of tilting the basket 12.

The lid 13 includes a front upright wall 17 with a central inlet opening 18 that is covered by a rigid forwardly projecting hood 19. A fore-and-aft extending grill structure 20 extends rearwardly from the hood 19 and includes forwardly disposed rod sections 21 that are pivotally supported at 22 to swing vertically so as to permit ingress and egress into and from the basket. Provided internally of the basket and supported on the forward wall thereof are a series of vertically spaced steps. Positioned on opposite sides of the grill structure 20 are a pair of fore-and-aft extending horizontal walkways 24, 25. A U-shaped hand rail 30 composed of a horizontal fore-and-aft extending portion 31 and a pair of integral leg portions 32, 33 is supported on the lid 13 of the basket. A forward leg 32 is supported on the forward wall 17 by means of a forwardly opening U-shaped bracket 34 that cradles around the lower end of the leg portion 32. A pin 35 projecting through the leg 32 and U-shaped bracket 34 is biased by a spring 36 to retain the leg 32 in a cardle relation to the bracket hand rail 30 may be laid in a repose or down position, such being shown in FIGS. 2 and 5. The opposite leg portion 33 is supported in a U-shaped bracket 40 in somewhat of a similar manner as the leg portion 32 is supported in the bracket 34. However, there is not provided a latch on the rear of the picker basket. Thus, when the latch 37 is moved to an unlatched position as shown in FIG. 5, both the leg portion 32 and 33 may be moved outside of the confines of the respective brackets 34 and 40 and the hand rail 30 be moved to its down position. Merely raising the hand rail 30 to a vertical or upright position will cause alignment of the leg portion 32, 33 with the brackets 34, 40 and the hand rail will be held in the upright position so that the latch 37 may be shifted to a locked position as shown in FIG. 3. This will, of course, prevent accidental release of the hand rail.

Also supported on the frame 10 forwardly of the beneath the basket 12 is a pair of row units 50, 51 that are adapted to harvest adjacent rows of cotton. The row units 50, 51 are composed of housing structure defining a pair of fore-and-aft extending passages 52, 53 for receiving adjacent rows of cotton plants as the harvester advances. Each of the harvesting structures 50, 51 has an upper horizontal plate or panel 54 that defines the top of the housing structure. The panels 54 are suitably braced and supported so as to carry the drive mechanism, not shown, for the respective harvesters as well as the support a person standing on the respective units. A pair of converging duct structures 55, 56 extend upwardly and rearwardly from lower ends receiving cotton from the outer, forward portions of the respective harvesting units 50, 51 to upper ends that feed into the opening 18 of the cotton picker basket 13. It will be noted that the left-hand duct structure 55 is on the same side as the pivot structure 15 that is utilized for tilting the basket 12. The housing of the harvesting unit 50 also includes an upright diagonally extending panel 57. Recessed in the panel 57 are a series of vertically spaced openings that define steps 58 on which a person may climb to the horizontal upper panel 54 of the unit 50. A hand support 59 is fixed to the forward, outer surface of the duct 55 so that a man climbing or descending the steps 58 may balance himself by gripping the support 59.

Supported on the frame 10 above the horizontal surfaces 54 and forwardly of the basket 12 is an operator's station 60 that includes a horizontal platform 61. Carried on the platform 61 is a forwardly facing seat 62 and a steering wheel and control console 63. Also extending upwardly from the platform 61 is structure that surrounds the seat 62 and includes in part a guard rail 64 forwardly of the seat and a side guard rail 65 on the left-hand side of the platform. The guard rails 64, 65 are bent downwardly and terminate in vertically disposed rails or rods 66, 67 that are spaced apart at the forward left-hand portion of the platform to define an entrance that is transversely offset to the left of the operator's seat 62. Consequently, while in the seat 62, an operator obtains the maximum protection of the guard rail 64. It should here be noted that the entrance defined by the vertical rail portions 66, 67 is in substantial diagonal alignment with the steps 58. Consequently, an operator ascending or descending from the operator's station may at all times have his feet on a step or horizontal platform and may also have manual control of his body by gripping the rods 64–67 and the hand grip 59. It should also be noted that the steps and entrance are in alignment along a diagonal line that is substantially parallel and inwardly of the duct structure 55. In the preferred form, it is considerably to the advantage of the operator to have the place of ingress and egress from the operator's station on the same side of the picker as the discharge side of the picker basket 12. When an operator leaves his station, it will very likely be for the purpose of watching the cotton being discharged from the picker basket. Consequently the activity for which an operator is most likely to leave his platform occurs on the same side of the picker that he will ascend and descend. A careless operator will normally take the shortest route to the area he desires to view. Consequently, with a less efficient positioning of the steps and other means for ascending the platform, the operator may well take a more hazardous journey. It should also be noted that the row units 50, 51 are provided with fore-and-aft extending drive shafts 68, 69 that extend to and drive the units. By locating the place of ingress and egress as it presently exists, the operator will not be inclined to step over a rotating drive shaft or other operating mechanism of the picker. In this respect, it should be noted that the steps 58 are completely to the left side of all operating mechanism of the picker. Unfortunately as it may be, many operators will descend from their platform while the picking mechanism of the picker is still in operation. This creates a potential hazard in that the operating mechanism in the passages 52, 53 may catch or throw material. Also, careless operators have a tendency to remove portions of the picker housings and leave operating mechanism exposed. By having the steps 58 on the forward outer portion of the harvester, even careless operators will be completely removed from the area of danger as they descend the steps.

Referring now to FIG. 7, there is provided an upright structure 70 rigid with and projecting upwardly from the rear portion of the platform 61. The upper end of the structure 70 is composed of a transverse rod 71 on which is pivotally mounted the upper ends of the duct structures 55, 56. Each of the row units 50, 51 has inner duct structures 72, 73 that are centrally located in respect to the harvester and receive cotton from the rear inner sides of the respective units 50, 51. Structures 72, 73 have upper ends discharging cotton into the opening 18 of the lid 13. The upper ends of the structures 72, 73 are also pivotally mounted on the rod 71. The purpose of providing pivoting of the upper ends of duct structures 55, 56 and 72, 73 is to accommodate vertical adjustment of the row units 50, 51.

A pair of vertically disposed side rails 74, 75 are provided and include upper portions that are mounted on the rod 71 and forward portions that extend alongside the outer sides of the duct structures 72, 73 and slightly forwardly thereof. Vertically spaced rungs 76 rigidly interjoin the side rails 74, 75 and operate as a ladder to permit an operator to ascend from the platform 61 to the top or lid 13 of the basket. As may be seen from viewing FIG. 1, an operator may first step on the guard rail 65 and from then upwardly onto the rungs 76. The hood 19 is provided with a pair of miniature side rails 77, 78 that are interjoined by a rung 79. The miniature side rails are a substantial vertical and rearward continuation of the side rails 74, 75. The entire structure 77–79 operates as an extension to the ladder as defined by the portions 74–76. Thus, a person climbing the ladder rungs 76 may step onto the rung 79.

It should also be noted that the latching end of the hand rail is provided adjacent the top of the ladder structure as defined by the rungs 76, 79. Thus, an operator standing on the rungs 76 may move the hand rail 30 from a reposed or down position to its upper position, as shown in dotted representation in FIG. 1. The hand rail 30 may also be latched or locked in its upright position while still standing on the rungs 76. Once the hand rail 30 is in its upper position, the operator may use it to balance himself in continuing to climb the rungs 76, 79 and to step onto the runways 24, 25.

The hand rail 30 is provided with a latch element 80. That is simply a bolt 81 extending through the horizontal portion 31 of the hand rail and that is spring loaded to depend downwardly when the hand rail 30 is in its upright position. The latch 80 is utilized to sit forwardly of the forward grill portions 21 when they are in a raised position. It will be noted from viewing FIGS. 1 and 2, that the latch 80 is forwardly of the pivot 22 and once placed behind the latch 80, gravity will cause the rail 21 to bear against it and remain in an upright or inclined position. This makes it easy for an operator to move down into or out of the basket.

What is claimed is:

1. In a cottom harvester having a main frame, forwardly disposed harvesting units, an operator's station including a platform supported on the frame above the harvesting units, a basket supported on the frame rearwardly of the platform and above the harvesting units and a plurality of transversely spaced blower ducts extending upwardly from lower ends receiving cotton from the harvesting units to upper ends adjacent the forward upper portion of the basket, the improvement residing in: an upright support rigid with and extending upwardly in respect to the platform alongside the forward portion of the basket and having an upper terminal end extending transversely across and forwardly of the upper forward portion of the basket; pivot means supporting the upper ends of the ducts on the upper terminal end for accommodating vertical movement of the harvesting units; a pair of transversely spaced parallel side rails supported on the terminal end and extending downwardly toward the operator's station; a plurality of vertically spaced ladder rungs fixed to the side rails and positioned closely adjacent to and forwardly of at least part of the ducts whereby an operator on the platform may ascend and descend between the top portion of the basket and the operator's station.

2. The structure as set forth in claim 1 characterized by the basket having a fore-and-aft extending grill along its top with a walkway alongside the grillwork accessible from the lander rungs; and a hand rail above the grillwork extending lengthwise of the basket whereby an operator may walk the walkway while holding the hand rail.

3. The structure as set forth in claim 2 in which the hand rail is U-shaped with the horizontal bight portion extending lengthwise of the basket and with its leg portions having their free ends pivotally carried on the basket whereby the hand rail may be laid horizontal when not in use.

4. The structure as set forth in claim 3 further characterized by latch means for retaining the hand rail in its vertical position.

5. In a cotton harvester having a main frame and forwardly disposed picking units supported thereon, the latter having a vertically disposed and shiftable conveying duct means receiving cotton from the units and having upper discharge means for discharging into the upper portion of a cottom basket, and an operator's platform above the picking units and forwardly of the duct means, the improvement residing in a pair of upright side rail structures supported on the platform completely independently of the duct means and disposed adjacent the sides of the duct means with upper ends thereof adjacent the discharge means of the duct means, and horizontal vertically spaced rung elements extending between the side rail structures forwardly of the duct means to afford a ladder for ascent and descent between the operator's platform and the top of the backet.

6. The structure as set forth in claim 5 characterized by a hood fixed to the upper portion of the basket and overlying the upper discharge means of the duct means for guiding cotton into the upper portion of the basket, the hood being in vertical alignment with the rung elements, and further characterized by a horizontal rung fixed to and supported on the outer surface of the hood to afford an extension of the ladder formed by the rung element extening between the side rail means.

7. The structure as set forth in claim 6 further characterized by a hand rail disposed above and extending fore-and-aft of the basket with a vertical portion fixed to the basket adjacent the hood whereby an operator ascending or descending the rung elements may manually hold on to the hand rail.

8. The structure as set forth in claim 5 further characterized by a hand rail extending longitudinally of and above the basket and mounted on the top of the basket for adjustment between a repose position lying atop the basket and an upright position above the basket.

9. The structure as set forth in claim 8 characterized by a latch closely adjacent the upper discharge means of the duct means for locking the hand rail in an upright position whereby an operator standing on an appropriate one of the rung elements may lock the hand rail in its upright position prior to ascent to the top of the basket.

10. In a two-row cotton picker for harvesting a pair of adjacent rows of cotton that includes a main frame, a picker basket supported on the frame to swing vertically on a fore-and-aft extending horizontal axis transversely and spacedly offset to one side of the fore-and-aft center line of the harvester whereby the basket may be tilted for discharging cotton over a fore-and-aft extending horizontal edge on the same side of the center line, a pair of harvesting units supported on the frame forwardly of and beneath the basket for harvesting rows of cotton on opposite sides of the fore-and-aft center line with each having an upper horizontal surface, and a pair of continuous duct structures converging upwardly and rearwardly from the forward end of and outer sides of the harvesting units to upper ends discharging into the basket, the improvement residing in an operator's station supported on the frame forwardly of the basket and including a platform spacedly above the horizontal surfaces and within the transverse expanse between the converging duct structures, a forwardly facing seat on the platform, and vertical structure substantially surrounding the platform and projecting above the platform with a forward entrance therein offset transversely from the seat and disposed relatively closely adjacent the duct structure on the same side of the operator's station as said horizontal axis; and step means on the forward outer portion of the harvesting unit on the same side of the harvester as said horizontal axis but inwardly of the respective duct structure for affording ascent to and descent from the horizontal upper surface of the latter harvesting unit, and whereby said steps and said entrance will be in substantial alignment along a diagonal line inwardly of and substantially parallel to the duct structure for the respective unit.

11. The structure as set forth in claim 10 further characterized by manual gripping means fixed to the respective duct structure for aiding a person ascending and descending the steps.

12. The structure as set forth in claim 10 further characterized by a ladder supported on the platform extending to the top of the basket.

13. The structure as set forth in claim 12 further characterized by a fore-and-aft extending hand rail supported on and above the basket and in reach of a person ascending and descending the ladder.

14. In a cotton basket used with a cotton harvester having a lid portion and in which cotton is dispatched in the basket from duct means blowing the cotton against the underside of the lid portion and from one side of the basket, and in which grill structure is provided in the lid to extend from the one side toward the opposite side and in the path of the cotton blown from the duct, the improvement residing in a walkway on the lid alongside opposite edges of the grill structure and extending from the one side toward the other side, and a hand rail centrally located above the grillwork and supported on the lid whereby a person on the walkway may balance himself.

15. In a cotton basket used with a cotton harvester having a lid portion and in which cotton is dispatched in the basket from duct means blowing the cotton against the underside of the lid portion and from one side of the basket, and in which grill structure is provided in the lid to extend from the one side toward the opposite side and in the path of the cotton blown from the duct, the improvement residing in a walkway on the lid alongside opposite edges of the grill structure and extending from the one side toward the other side, a hand rail centrally located above the grillwork and supported on the lid whereby a person on the walkway may balance himself, means supporting the hand rail on the lid to move vertically between a repose position and an upright position; ladder means for ascending to and descending from the basket lid, a latch located at the top of the ladder for locking the hand rail in its upright position and whereby an operator may position the hand rail prior to ascending onto the walkway; means supporting at least a portion of the grill structure to swing vertically from an edge of the basket at the top of the ladder to thereby provide an opening for egress and ingress into the basket, said hand rail having a vertical portion projecting upwardly from the edge and a horizontal portion projecting from the upper end of the vertical portion whereby a person may grip the hand rail to aid him in moving over the edge out of and into the basket; and latch means on the hand rail for holding the grill structure in its open position.

16. The structure as set forth in claim 15 further characterized by step means internally of the basket vertically aligned with the edge to aid in ascent into and descent out of the basket.

References Cited

UNITED STATES PATENTS

| | | | |
|---|---|---|---|
| 560,238 | 5/1896 | Smith, Jr. | 105—457 |
| 1,149,368 | 8/1915 | Johnson | 105—457 |
| 2,862,342 | 12/1958 | Fergason | 56—12 |
| 3,412,532 | 11/1968 | Nickla | 56—12 |
| 3,419,168 | 12/1968 | Isbell et al. | 56—12X |
| 3,422,751 | 1/1969 | Hubbard | 56—12X |

LOUIS G. MANCENE, Primary Examiner

J. N. ESKOVITZ, Assistant Examiner